United States Patent [19]

Allenthorp et al.

[11] 4,027,739
[45] June 7, 1977

[54] MINICAMPER

[76] Inventors: Douglas L. Allenthorp, 16222 Monterey Lane, No. 96, Huntington Beach, Calif. 92649; Michael L. Galleher, 11645 Mapledale St., Norwalk, Calif. 90650

[22] Filed: May 7, 1975

[21] Appl. No.: 575,352

[52] U.S. Cl. .............................. 180/89.1; 280/160; 296/23 R; 296/35 A
[51] Int. Cl.² ...................................... B62D 23/00
[58] Field of Search .............. 296/35 R, 35 A, 1 R, 296/23 R, 23 MC, 28 R, 28 F, 28 G, 28 K; 280/721, 723, 160; 180/89 R

[56] References Cited

UNITED STATES PATENTS

| | | | |
|---|---|---|---|
| 789,961 | 5/1905 | Call | 296/35 A |
| 1,450,622 | 4/1923 | Wesnick | 296/28 R X |
| 1,467,645 | 9/1923 | McPherson | 296/28 R X |
| 2,003,287 | 6/1935 | Fitch | 296/35 A X |
| 2,242,269 | 5/1941 | Siebler | 296/35 R |
| 3,496,689 | 2/1970 | Nerem | 296/23 R X |
| 3,883,166 | 5/1975 | Cadiou | 296/28 R X |

*Primary Examiner*—L. J. Paperner
*Assistant Examiner*—Winston H. Douglas
*Attorney, Agent, or Firm*—John T. Matlago

[57] ABSTRACT

A camper body is adapted to be mounted on a stripped down, converted chassis of a small automobile to provide a minicamper vehicle. Only the front hood and fenders of the original body are left on the chassis. The camper body includes a new windshield opening and provides side floorboard portions on the bottom sides thereof which attach to the respective sides of the original floorpan of the chassis and thereby serve to widen the floorboard of the camper body. Stepped portions on the bottom rear of the camper body provide for extending over the rear wheels and the motor mounted on the rear of the chassis for the purpose of lengthening the camper body.

9 Claims, 10 Drawing Figures

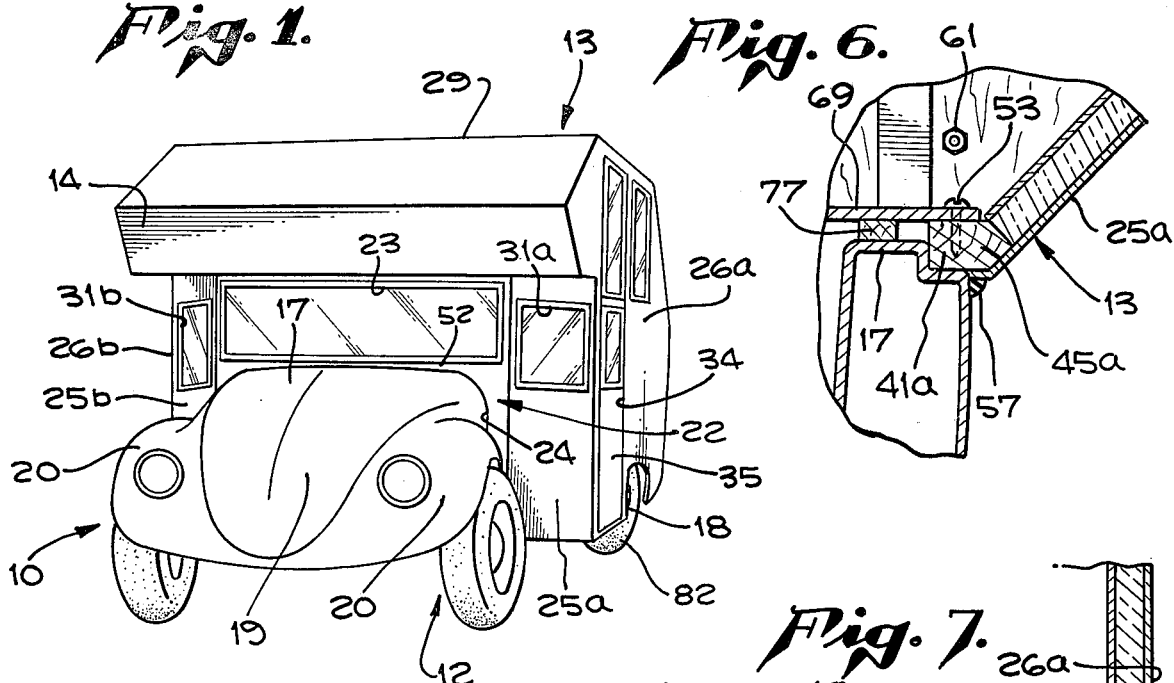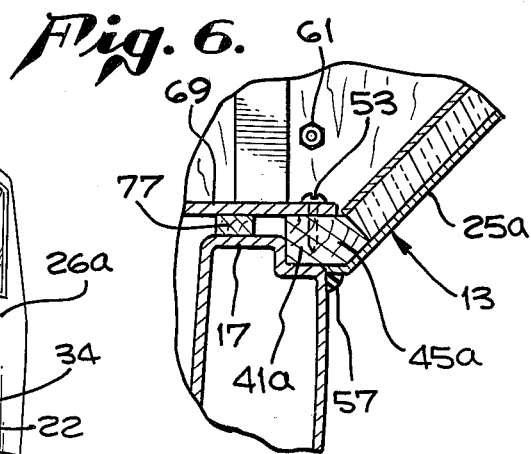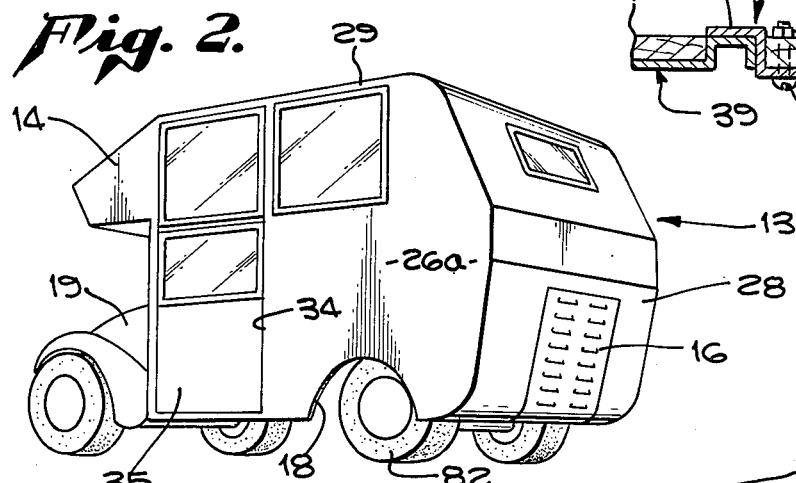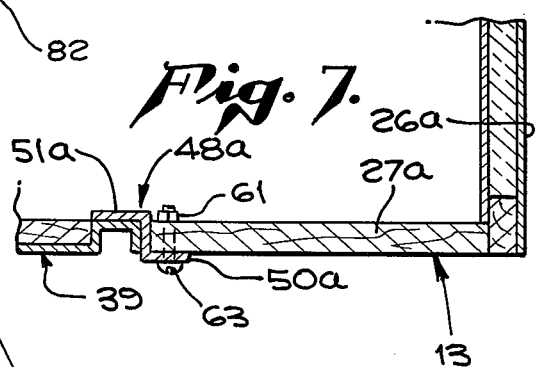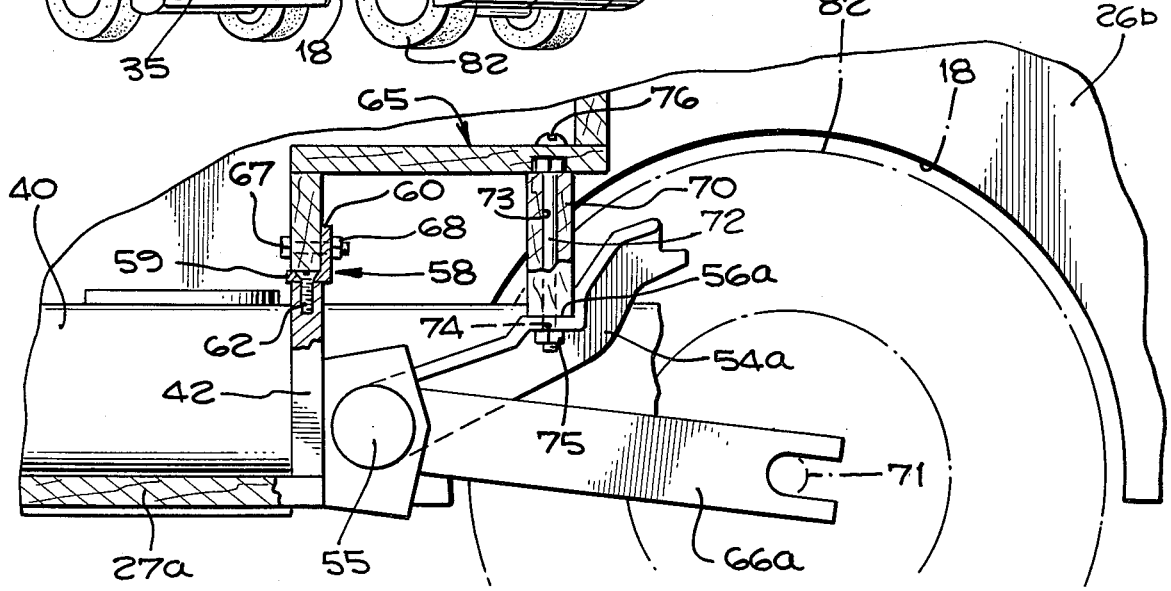

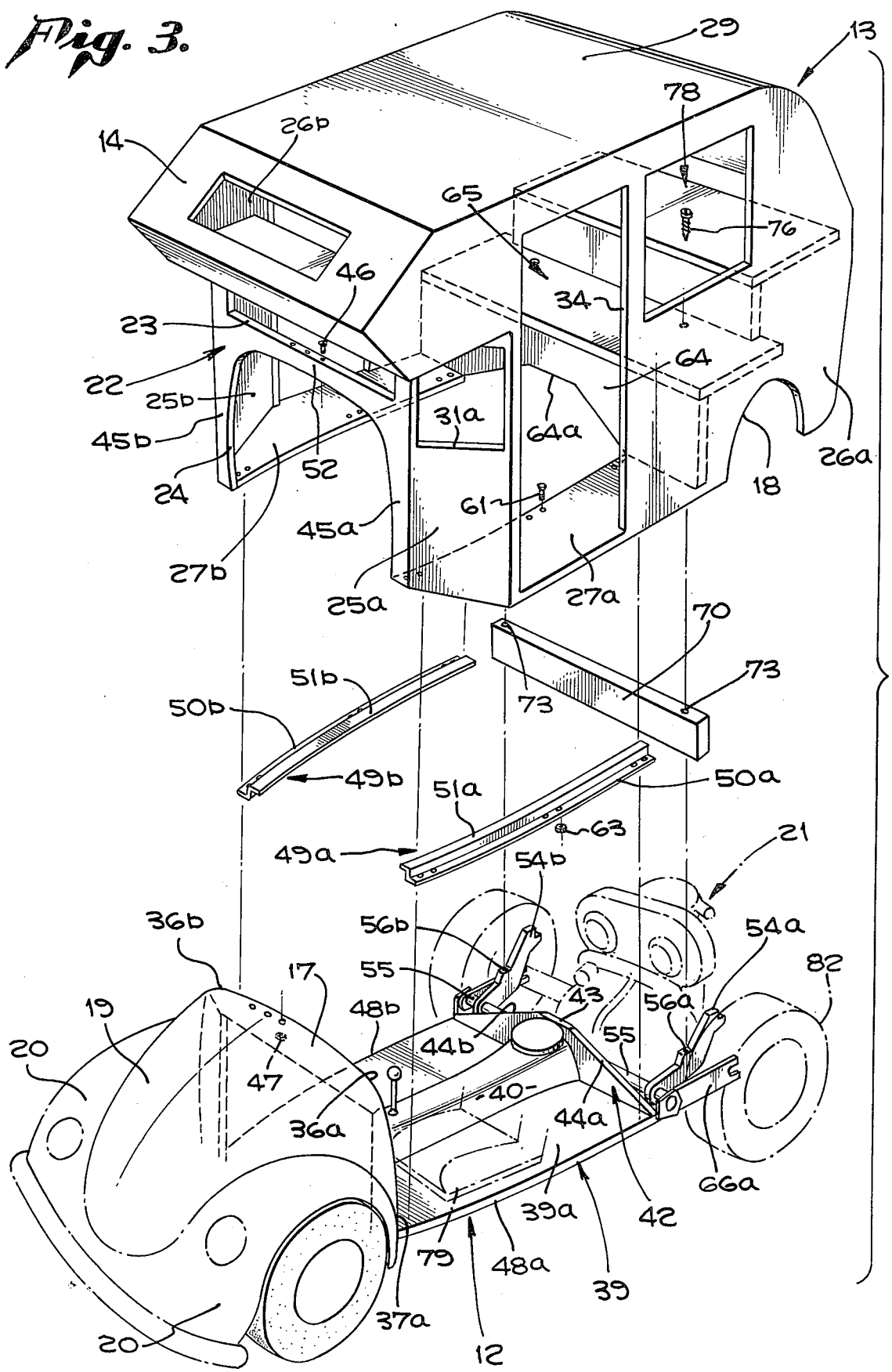

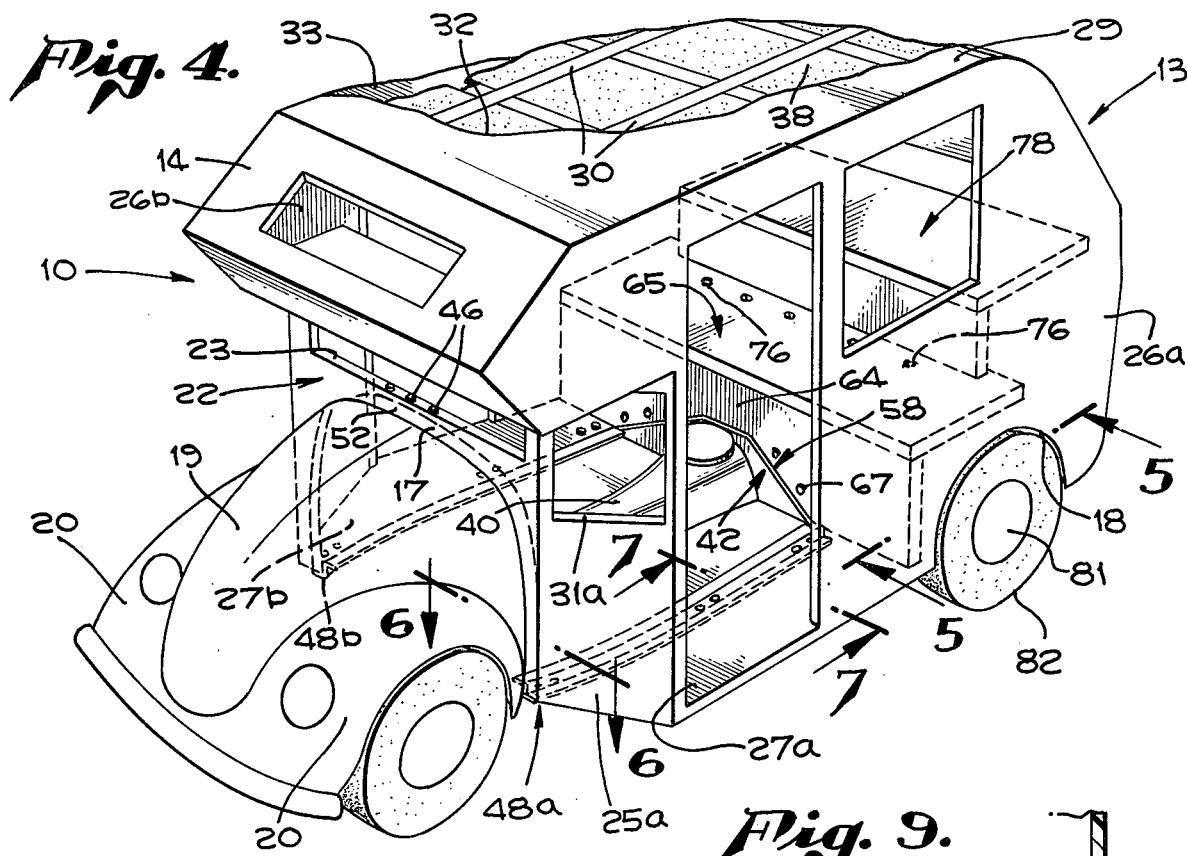
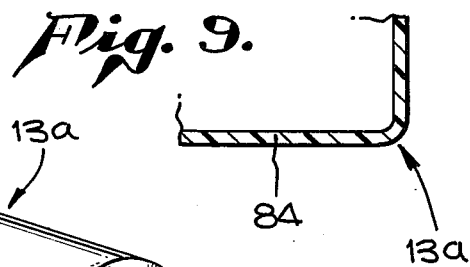
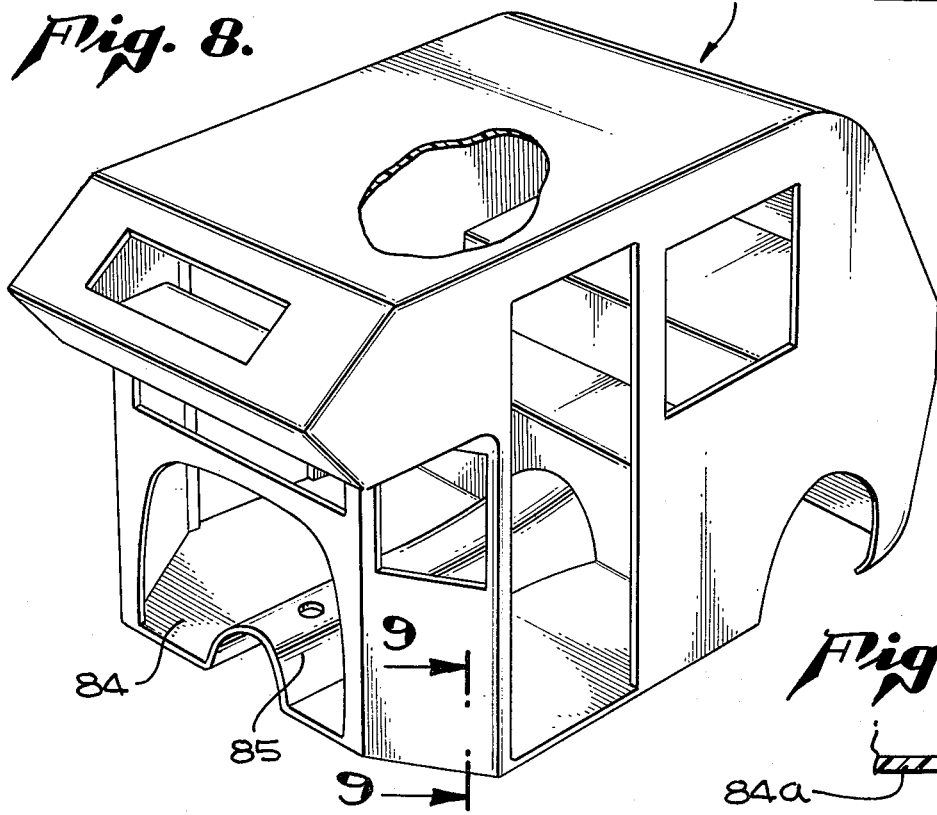
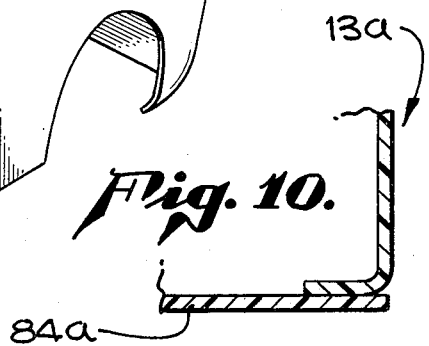

MINICAMPER

This invention relates to camper vehicles and more particularly to the forming and adapting of a camper body for attachment to the partially stripped down chassis of a small automobile to provide a minicamper vehicle.

For the sake of economy, the overall design of some of the smaller automobiles that have been provided on the market the past several years have been standardized. That is, the size and shape of the chassis as well as the overall contour of the body of these automobiles have been manufactured year after year with very little change. There are, therefore, many such automobiles of older vintage that are presently owned or available on the market wherein although the chassis including the motor is in operable condition, the body may be dented or otherwise in need of a repair or paint job. It thus appears that it would be highly practical and very economical to provide camper bodies which can be readily mounted on the partially stripped down chassis of these automobiles with but a minimum of conversion needed.

Thus, in accordance with the present invention the frame of the original body of the small automobile is cut along the top and bottom of the cowling support provided about the dashboard. The windshield and the remainder of the original body to the rear of the windshield is then removed from the chassis leaving only the original front hood and fenders intact on the chassis. The camper body of the present invention which is a separately fabricated unit is then adapted to be readily mounted onto the stripped down, converted chassis.

Briefly, the camper body of the present invention comprises a flat, front wall portion which includes a new windshield opening. Depending below the windshield opening on the front wall is a frame whose sides form an opening which corresponds in shape to the cowling support formed by the hood portion of the original automobile body which remains on the converted chassis. This frame is attached to the cowling support and thus provides a front support for the camper body on the chassis. The widened body of the camper is provided on either side of the bottom thereof with side floorboard portions which are attached to the respective sides of the original floor pan of the chassis. The side floorboard portions thus provide side supports for the camper body and also serve as extensions of the original floorboard of the chassis. The bottom of the camper body toward the rear thereof is provided with a flat vertical step portion which is attached to bracket arms extending from the rear of the chassis. The first vertical step portion thus provides a rear support for the camper body on the chassis and also provides clearance for the rear wheels. The bottom of the camper body also includes a second vertical step portion which extends over the motor mounted on the rear of the chassis.

Accordingly, one of the subjects of the present invention is to provide a minicamper vehicle by providing a prefabricated camper body for mounting on the partially, stripped down, chassis of a small automobile.

Another object of the present invention is to provide for extending the sides of the chassis of a small automobile so as to provide an enlarged floorboard for a camper body being attached to the chassis.

Still another object of the present invention is to provide for simply adapting a camper body for attachment to the stripped down chassis of a small automobile.

Still another object of the present invention is to provide for installing a camper body which includes the windshield area onto the converted chassis of a small automobile.

With these and other objects in view, the invention consists in the construction, arrangement and combination of the various parts of the device whereby the objects contemplated are attained as hereinafter set forth, pointed out in the appended claims, and illustrated in the accompanying drawings:

Referring to the drawings:

FIG. 1 is a front perspective view of the minicamper of the present invention;

FIG. 2 is a side and rear perspective view of the minicamper;

FIG. 3 is an exploded view showing the converted chassis, the body and the parts provided for attaching the body to the chassis;

FIG. 4 is an assembled view of the body attached to the converted chassis;

FIG. 5 is a view partially in section taken in the direction of arrows 5—5 in FIG. 4;

FIG. 6 is a view partially in section taken in the direction of arrows 6—6 in FIG. 4;

FIG. 7 is a sectional view taken in the direction of arrows 7—7 in FIG. 4;

FIG. 8 is a perspective view of a unitary molded embodiment of the body;

FIG. 9 is a section taken in the direction of the arrows 9—9 in FIG. 8; and

FIG. 10 is a section similar to FIG. 9 but showing that the floor of the molded body may be a separate molding.

The minicamper vehicle 10 of the present invention is illustrated in FIGS. 1 and 2. The minicamper vehicle includes a chassis 12 of a small automobile which has been converted such that only the original front hood 19 and fenders 20 remain intact on the chassis.

The camper body 13 is provided with a front wall 22 which includes a windshield opening 23 and a depending frame having an opening 24 which corresponds to the shape of a cowling support 17 forming the upper end of the front hood 19. The camper body 13 includes short front outwardly included sidewall portions 25a and 25b, sidewalls 26a and 26b, a rear wall 28, and a top wall 29. A panel door 16 is provided on the lower rear wall 28 to provide access to the motor 21 (FIG. 3) mounted on the rear of the chassis 12.

A canope 14 extends forwardly of the front wall 22 above the windshield opening 23. Window openings 31a and 31b are provided on the front inclined sidewall portions 25a and 25b, respectively, to provide the driver of the minicamper vehicle 10 with a good side view of the road. An opening 34 for a door 35 is located on the sidewall 26a adjacent the front inclined sidewall portion 25a. Circular cutouts 18 are provided on the rear portions of either of the sidewalls 26a and 26b for accommodating the rear wheels 81. It should be especially noted that the camper body 13 is on the order of being one half again wider that the width of the front body portions as indicated by the front hood 19 and front fenders 20.

Referring to FIG. 3, the chassis 12 of the automobile which is a sedan has been converted by cutting off the side frames of the original windshield adjacent the upper ends 36a and 36b of the cowling support 17 and the bottoms of the body frame adjacent the lower ends 37a and 37b of the cowling support 17. The remainder of the original body of the sedan is then removed including the sides, the roof, the rear trunk, the rear fenders and the running boards, leaving only the front hood 19 and fenders 20 still intact on the chassis 12 as previously described. The chassis 12 includes a metal floorpan 39 having a longitudinal tunnel 40 extending along the central portion thereof and a metal transverse wall 42 attached to the rear thereof. The rear transverse wall 42 has an upper central flat edge 43 with downwardly inclined flat edges 44a and 44b on either side thereof.

The metal floorpan 39 defining the chassis 12 has sides 48a and 48b which curve slightly inwardly on the front end portion thereof. A pair of Z shaped members 49a and 49b have their upper horizontal portions 51a and 51b attached by welding to the respective sides 48a and 48b of the floorpan 39. Rearwardly and upwardly extending bracket arms 54a and 54b have their lower ends attached to the outer ends of transverse torsion bars 55 mounted on the rear at either end of the floorpan 39. Horizontal arms 66a and 66b couple the floorpan 39 to the rear axle 71. The rear bracket arms 54a and 54b are provided with horizontal flats 56a and 56b intermediate the ends thereof. A transverse support member 70 which may be made of wood is positioned such that its ends rest on the flats 56a and 56b of the bracket arms 54a and 54b. Bolts 72 pass through openings 73 on the ends of support member 70 and through openings 74 on the flats of the bracket arms and have nuts 75 on the ends thereof for the purpose of holding these parts together. As shown in FIG. 5, an L shaped metal member 58 which is bent to conform with the upper flat edge surfaces of the rear transverse wall 42 has its horizontal leg 59 attached to these edge surfaces by screws 62. This completes the conversion of the chassis 12 to receive the body 13.

The front wall and the bottom of the body 13 are especially constructed to enable the body to be easily mounted on the converted chassis as above described. Thus the front wall 22 of the body 13 is provided with a frame including a cross brace 52 which, in addition to forming the lower ledge of the windshield opening 23 also forms, along with the sides 45a and 45b, the opening 24. The frame of the front wall forming the opening 24 is fitted closely about upper peripheral surface of the hood 19 forming the cowling support 17 and is attached thereto by three bolts 46 and nuts 47 extending through the central portion of the cross brace 52 on the front wall 22. As shown in FIG. 6, the inner surfaces of the sides 45a and 45b of the opening 24 are curved so as to snugly fit against correspondingly curved shoulders provided on the faces of the respective sides of the cowling support 17, as exemplified by the curved shoulder 41a. A sheet of panelling 69 below the dashboard (not shown) is attached to the inner surface of the front wall by screws 53 and thereby holds the curved sides 45a and 45b of the front wall 22 seated against the respective shoulders of cowling support 17. Wood spacers 77 may be provided as needed to help support the panelling 69. A rubber bead or moulding 57 is placed between the parts to ensure that the crack formed by opening 24 about cowling support 17 is sealed.

The bottoms of the sidewalls 26a and 26b of the camper body 13 are fabricated with side floorboard portions 27a and 27b. The inner edges of the side floorboard portions 27a and 27b are supported on the lower horizontal portions 50a and 50b of the Z shaped members 49a and 49b and bolted in position by bolts 61 and nuts 63. Thus when the body 13 is mounted on the converted chassis 12 these side floorboard portions 27a and 27b serve to widen the floorboard of the minicamper vehicle 10.

A first vertical step portion 65 is formed on the bottom of body 13 in order to provide support for the rear portion thereof on the chassis 12. As shown in FIG. 5, a vertically disposed kickboard 64 on the step portion 65 has its lower edge 64a shaped to be fitted into the channel provided by the L shaped member 58 and is bolted to the vertical leg 60 of member 58 by bolts 67 and nuts 68. Screws 76 are then provided to fasten the first step portion 65 to the transverse support member 70 upon which it is resting. The first vertical step portion 65 preferably extends from one side wall 26a to the other side wall 26b of the body 13 and the end side portions thereof serve to provide wells for the rear wheels 81 having oversize tires 82 thereon. A second vertical step portion 78 is provided on the bottom of body 13 to the rear of the first vertical step portion 65 to enable the rear bottom of the body to fit over the motor 21 mounted on the rear of the chassis 12.

It should be noted that when the body 13 is so mounted on the chassis 12, it has very little overhang on the back of the chassis 12. The chassis 13 is provided with rear torsion bars 55 that are of sufficient size to compensate for the added weight of the camper body 13 on the chassis 12. Furthermore, heavy duty shock absorbers (not shown) are installed on the upper ends of the bracket arms 54a and 54b along with wider rim wheels 81 and oversize tires 82 to provide added stability.

The camper body 13 of the preferred embodiment shown in FIG. 2 may be constructed in a conventional manner. The framework of the body 13, as indicated in FIG. 4, may thus comprise pieces 30 of firwood held together by staples and screws in a well known manner. The interior of the body may then be panelled with plywood 33 and the exterior may be covered with a sheeting of corrugated aluminum 32. A styrofoam insulation 38 may be sandwiched between the wall so formed.

As shown in FIG. 8, the body to be mounted on chassis 12 may be a molded fiberglass unit 13a instead of being fabricated by use of a wood framework as shown and described in connection with FIG. 4. Moreover, the floorboard portion 84 of the molded body 13, as well as the fabricated body, may be formed with an elongated semicircular tunnel 85 formed thereon for closely fitting over the tunnel 40 provided on the floorboard of the chassis 12. The floorboard portion may then be anchored to the the sides of metal floorpan 39 of the chassis by conventional securing means. The floorboard portion 84 of the molded body 13a may be an integral part of the body as indicated in FIG. 9 or may be a separately molded part 84a as indicated in FIG. 10.

It should be understood that the widening of the floorboard defined by the floorpan 39 of the chassis 12 and thereby the floorspace of the camper body 13, together with the lengthening of the body 13 by providing the first and second vertical step portions 65 and 78, and the extending of the height of the camper body 13, provides a relatively large interior structure for the minicamper vehicle. The interior of body 13 thus extends longitudinally from the front wall 23 which includes the windshield opening 23 to the rear wall 28 thereof which overhangs only slightly more than would the rear portion of the body of the original automobile body. The first vertical step portion 65 which provides for supporting the rear portion of the camper body 13 is of great use within the camper body 13 either as a table or as a bed. The space on the sides of the second vertical step portion 78 may be used for cabinets, for example. Furthermore, the overhang of the top front portion of the body which forms canopy 14 over the windshield opening 19 provides an additional shelf space which can be also used for storage and supporting a pull-out bed, for example. The front seats normally provided within the automobile, one of which seats is shown by dashed lines 79 in FIG. 3, may be mounted on swivels (not shown) so that they can be rotated to face the interior of the minicamper vehicle 10 when not being used for driving purposes.

It should now be evident that the minicamper vehicle 10 of the present invention has been developed as an answer to the gasoline shortage for those who still enjoy camping out but must maintain economical budgets. Furthermore, the minicamper vehicle 10 of the present invention because of its light weight and compact size serves as an every day transportation vehicle and not just a weekend vacation vehicle and motor home.

From the above description, it will be apparent that there is thus provided a minicamper of the character described possessing the particular features of advantage before enumerated as desirable, but which obviously is susceptible of modification in its form, proportions, and arrangement of parts without departing from the principle involved or sacrificing any of its advantages.

While in order to comply with the statutes, the invention has been described in language more or less specific as to structural features, it is to be understood that the invention is not limited to the specific features shown, but that the means and construction herein disclosed comprises a preferred form of putting the invention into effect and the invention is therefore claimed in any of its forms or modifications within the legitimate and valid scope of the appended claims.

What is claimed is:

1. A camper body in combination with a chassis having front and rear wheels and a hood and front fenders supported thereon by a cowling support provided with shoulders on the side faces thereof, and including a floorboard having bracket arms extending rearwardly and angularly upwardly from the rear sides thereof, said camper body comprising top, front, rear and sidewalls, with the lower portion of the front wall forming a frame disposed below an opening provided on the front wall for a windshield, said sidewalls having inwardly extending side floorboard portions on the bottoms thereof and provided with an upwardly stepped portion on the rear bottom thereof spaced inwardly of the rear wall thereof, and a transverse support member beneath said stepped portion, said transverse support member being shorter than and centered in the spacing between the sidewalls, said camper body being mounted on said chassis with said frame on the front wall fitted about said cowling support and anchored to the top thereof with the sides of said frame being seated against the shoulders formed on the respective side faces of the cowling support and with the inwardly extending side floorboard portions on the bottom of the sidewalls disposed adjacent to and anchored to the sides of the floorboard of said chassis to provide a continuation thereof, and with the transverse support member beneath the stepped portion thereof resting on and anchored to said bracket arms, whereby the inwardly extending floorboard portions on the bottoms of the sidewalls of the camper body provide for the floorboard of the assembled camper body being on the order of half again wider than the width of the floorboard of the chassis, and whereby the stepped portion on the rear bottom of the camper body provides clearance within the sidewalls for the rear wheels on the chassis.

2. The invention in accordance with claim 1 wherein said chassis has a motor mounted on the rear thereof and wherein the bottom of said camper body includes an additional upwardly stepped portion disposed rearwardly of said stepped portion, said additional stepped portion providing for extending the bottom of said camper body over said motor.

3. The invention in accordance with claim 1 including a transverse wall on the rear of the floorboard of said chassis having a flat upper edge, said stepped portion including a vertically disposed member whose lower flat edge mates with the flat upper edge of said transverse wall, and means for anchoring the lower edge of said vertically disposed member to the upper edge of said transverse wall.

4. The invention in accordance with claim 1 including an overhang portion on the top of the windshield opening on the front wall of the camper body.

5. The invention in accordance with claim 1 wherein the forward ends of the bottom side floorboard portions on said body are inclined rearwardly and outwardly from the floorboard of the chassis.

6. The invention in accordance with claim 1 wherein said floorboard of said chassis includes a longitudinal tunnel disposed centrally along the length thereof, and said bottom of the camper body includes an integral portion between the side floorboard portions thereof which is supported by the floorboard of said chassis and includes a tunnel which fits over the tunnel of said chassis.

7. The invention in accordance with claim 6 wherein said camper body including the bottom side floorboard portions and the integral portion between said side floorboard portions is a molded structure.

8. The invention in accordance with claim 1 wherein said camper body is fabricated from wood frame structures with panelling on the interior surface thereof and metal sheeting on the exterior surface thereof and with insulation therebetween.

9. A camper body in combination with a chassis having front and rear wheels and a hood and front fenders supported thereon by a cowling support provided with shoulders on the side faces thereof, and including a floorboard having bracket arms extending rearwardly and angularly upwardly from the rear sides thereof, said camper body comprising top, front, rear and sidewalls with the lower portion of the front wall forming a frame disposed below an opening provided on the front wall for a windshield, said sidewalls having inwardly extending side floorboard portions on the bottoms thereof and provided with an upwardly stepped portion on the rear bottom thereof spaced inwardly of the rear wall thereof, and a transverse support member anchored beneath said stepped portion, said transverse support member being shorter than and centered in the spacing between the sidewalls, said camper body being mounted on said chassis with the top of the frame on the front wall thereof seated against and anchored to the top of said cowling support and with the sides of said frame being seated against the respective side faces of the cowling support so as to abut the shoulders formed thereon and with the inwardly extending side floorboard portions on the bottoms of the sidewalls supported in part on and anchored to respective side portions of the floorboard of said chassis to provide for the widening thereof, and with the transverse support member beneath the stepped portion thereof supported on and anchored to said bracket arms, whereby the inwardly extending floorboard portions on the bottoms of the sidewalls of the camper body provide for the floorboard of the assembled camper body being on the order of half again wider than the width of the floorboard of the chassis, and whereby the transverse support member beneath the stepped portion on the rear bottom of the camper body provides clearance within the sidewalls for the rear wheels on the chassis.

* * * * *